United States Patent Office
3,055,457
Patented Sept. 25, 1962

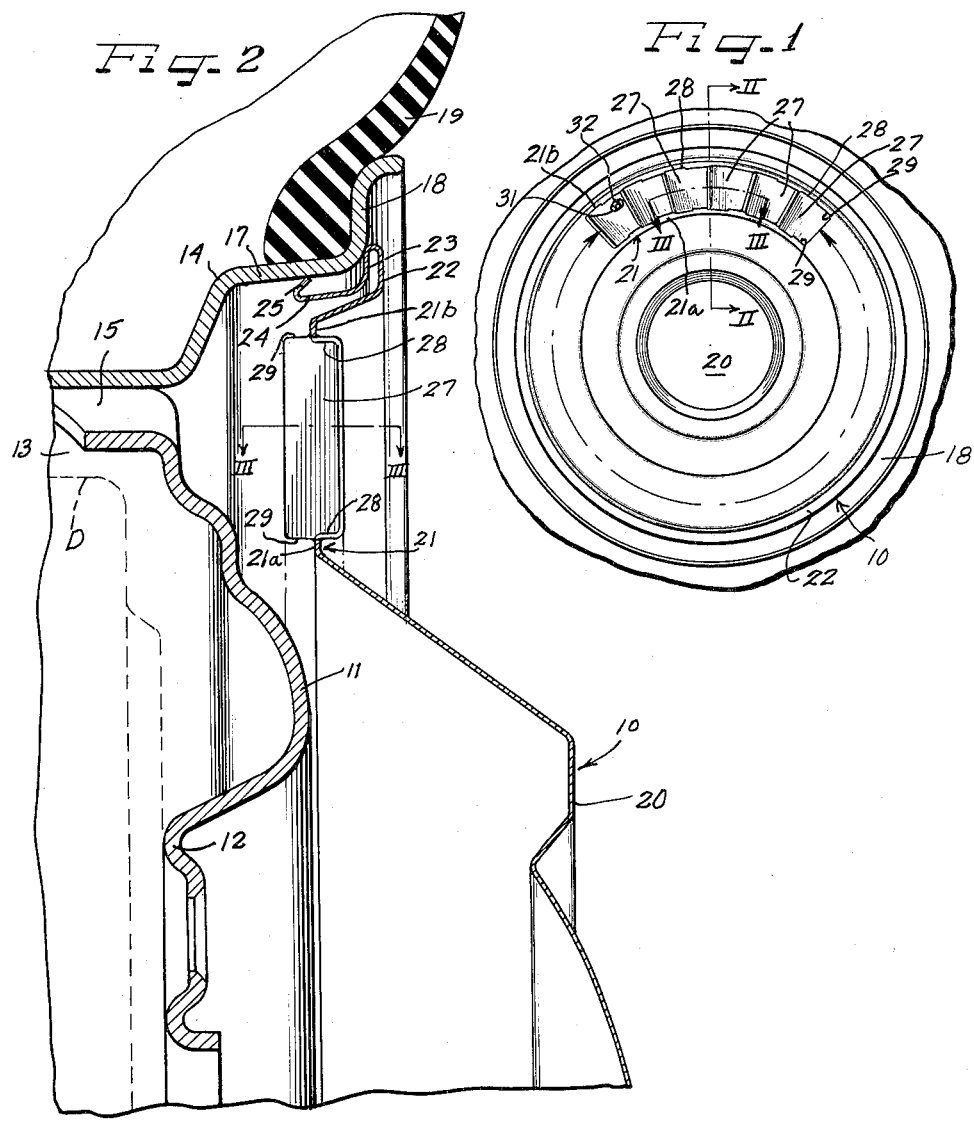
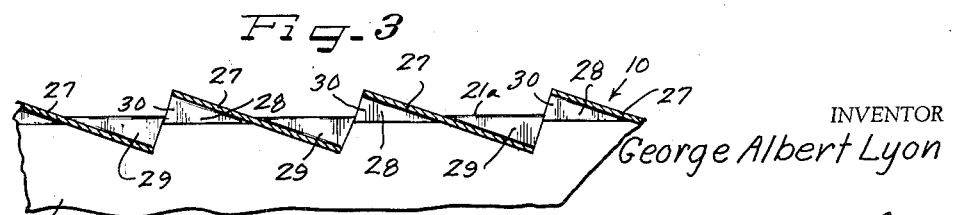

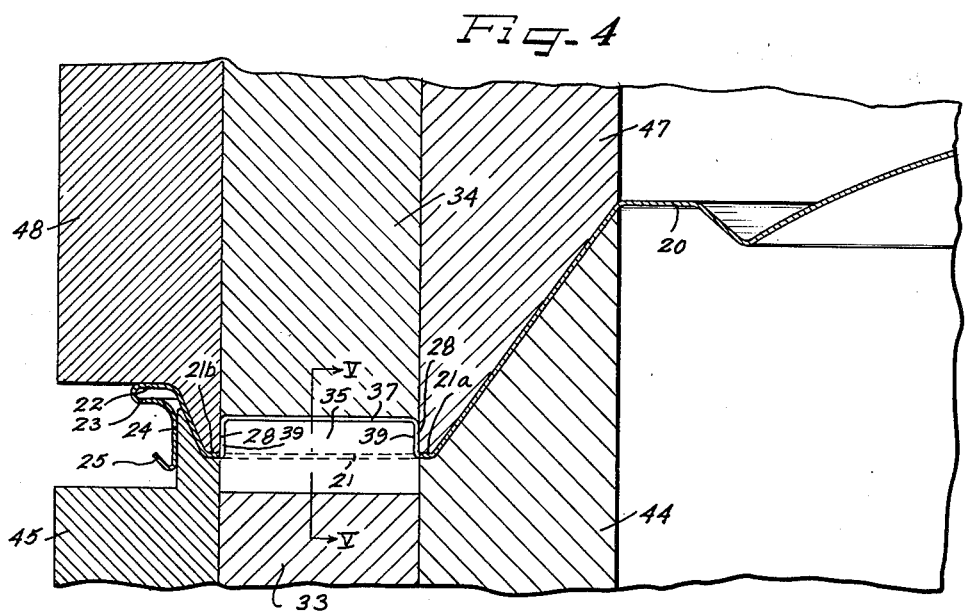
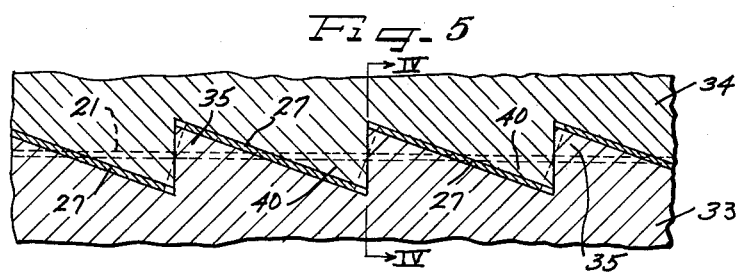
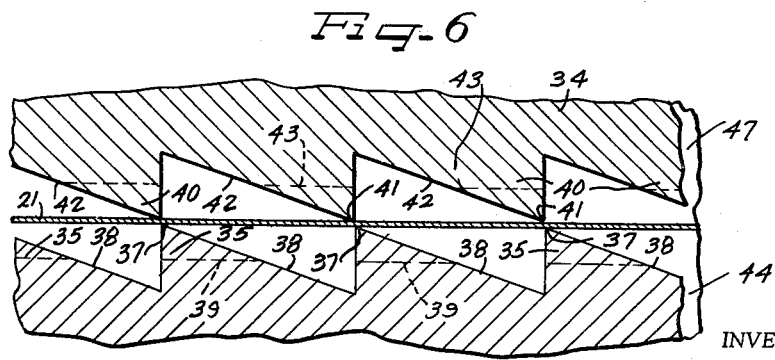

3,055,457
AIR CIRCULATION WHEEL COVER
George Albert Lyon, Detroit, Mich., assignor to Lyon Incorporated, Detroit, Mich., a corporation of Delaware
Filed Feb. 25, 1960, Ser. No. 11,077
8 Claims. (Cl. 188—264)

The present invention relates to improvements in wheel structures and more particularly concerns an ornamental and protective wheel cover having novel air circulation promoting means thereon.

Due to smaller wheel sizes, greater operating speeds and greater vehicle weight, among other factors, automobile brake drums on especially the larger types of automobiles now current, are highly susceptible to overheating in operation with consequent rapid deterioration of the brakes and more particularly the brake linings and friction surfaces essential to brake operation. Since at least a large proportion of such automobiles are equipped with wheel covers or trim there has been some effort directed to enabling or promoting circulation of cooling air through the covers and in cooling relation to the brake drums. Simple openings through the cover members passively permit air to move therethrough where causes such as centrifugal motion, inertia effects, cross wind air currents or special air motivating devices carried by the wheel cause air movement.

In respect to such cover members as have been proposed equipped with scoops, louvers, vanes and the like for effecting circulating movement of air engaged thereby, some have proved to function adequately but to add undesirable cost factors to the cover members, while others have sacrificed efficiency for greater economy.

It is an important object of the present invention to provide an improved wheel cover member having novel air circulation promoting structure arranged to operate in service running of the wheel with which associated to effect efficient cooling circulation of air through the wheel and in cooling relation to the associated brake drum.

Another object of the invention is to provide improved air circulation promoting structure on a wheel cover member which can be produced at low cost with simple, relatively inexpensive, fast acting die mechanism.

A further object of the invention is to provide improved air circulation promoting means on wheel cover members involving minimum displacement of material in the formation of such means integrally on a sheet metal cover member while yet attaining maximum air circulation impelling surface areas.

Still another object of the invention is to provide an improved air circulation wheel cover member with novel air impelling vane structure.

Yet another object of the invention is to provide an improved method of forming air vanes in a sheet metal cover member, such method being characterized by maximum air vane area displacement to provide maximum effective vane depth in minimum depth of drawing and distortion of the material of the cover member.

A still further object of the invention is to provide improved apparatus for forming air circulating vanes in a sheet metal wheel cover member.

Other objects, features and advantages of the present invention will be readily apparent from the following description of a preferred embodiment taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a sectional elevational detail view taken substantially on the line III—III of FIGURES 1 and 2;

FIGURE 4 is a fragmentary vertical sectional view through forming die apparatus wherein the method of forming the air circulation vanes in the wheel cover member is practiced, such view being taken substantially on the line IV—IV of FIGURE 5;

FIGURE 5 is a fragmentary vertical sectional detail view taken substantially on the line V—V of FIGURE 4; and FIGURE 6 is a sectional view similar to FIGURE 5 but showing the vane forming die members at the moment of engagement with the wheel cover member blank during a forming stroke of the die members.

Referring to FIGURES 1 and 2, a wheel cover member 10 is constructed and arranged to be applied in covering, protective relation over the outer side of a vehicle wheel and more particularly an automobile wheel which includes a disk spider wheel body 11 having a central bolt-on flange 12 and provided with an outer peripheral attachment flange 13 by which the wheel body is attached to a multi-flange, drop center tire rim 14. At suitable intervals such as four, the attachment flange 13 is inset to provide openings through the wheel adjacent to the tire rim and through which openings air is adapted to circulate not only for cooling the wheel but also, and more particularly, a brake drum D associated with the axle part to which the wheel body bolt-on flange 12 is secured in service on a vehicle in the usual manner.

On its outer side, the tire rim 14 includes a generally axially outwardly extending and radially inwardly facing intermediate flange 17 which, as is usual is spaced substantially radially outwardly beyond the wheel openings 15 and merges at its axially outer end with a terminal flange 18. A pneumatic tire 19 is adapted to be supported by the tire rim.

Although the cover member 10 is in the present instance disclosed as a full disk cover, that is a cover that in and of itself substantially entirely covers the outer side of the wheel, it may as is known in this art comprise an annular member associated in assembly on the wheel with a central hub cap carried by the wheel body 11. Any suitable sheet metal of appropriate gauge may be used in making the wheel cover 10, such as stainless steel, brass, or the like susceptible of being die stamp drawn and cold worked into the desired circular shape and cross-sectional contours of the finished cover.

In the present instance, the wheel cover 10 has a central generally axially outwardly projecting crown portion 20 which centrally overlies the wheel body 11 and has thereabout an intermediate generally axially inwardly dished annular portion 21 of a width to overlie the adjacent portions of the wheel body 11 and the tire rim 14 and more particularly the wheel openings 15. At its radially outer extremity, the cover member has a generally radially outwardly extending marginal portion 22 for overlying the radially inner portion of the terminal flange 18 and provided with an underturned reinforcing flange 23 having extending generally axially inwardly therefrom a circumferential series of cover retaining resilient finger extensions 24, each provided with a turned radially and axially outwardly oblique terminal flange 25 which is grippingly retainingly engageable at its tip with the intermediate flange 17 of the tire rim in press-on, pry-off relation. In other words, the cover 10 may be constructed generally in accordance with my Patent 2,624,634 issued January 6, 1953.

According to the present invention, the intermediate cover portion 21 is subdivided throughout the major extent of its width and throughout its circumference into a series of circumferentially tilted air circulation promoting vanes 27. Each of the vanes 27 is tilted across and extends substantially equally axially outwardly and axially inwardly from the original plane of the axially innermost or base part of the intermediate cover portion 21 with an angular generally axially extending triangular wall portion 28 connecting the sides of the axially outermost projecting portion of the vane integrally in one piece with annular radially inner and radially outer marginal portions 21a and 21b of the intermediate cover portion alongside the vanes. The axially inwardly extending portions of the vanes 27 are connected integrally with the annular radially inner and radially outer side portions 21a and 21b by generally axially inwardly extending triangular side flanges 29. Thereby, the vanes 27 are substantially reinforced by the triangular connecting flanges 28 and 29, and the entire intermediate cover portion 21 is substantially reinforced to compensate for the radial slitting thereof to effect separation of the adjacent ends of the vanes 27 and offsetting of such ends to provide air openings 30 between the offset ends.

Since the vanes 27 and the rather substantial openings 30 between the adjacent ends of the respective vanes are located opposite the wheel openings 15, that is in general axial alignment therewith, effective circulation of air is impelled by the vanes through the wheel cover 10 and through the wheel openings 15. Where the cover 10 is mounted on the wheel so that the axially outer edges of the vanes 27 advance in the rotation of the cover with the wheel, the axially outer portions of the vanes 27 scoop air through the mouth openings 30 to be impelled generally axially inwardly by the vanes toward the wheel openings 15. In such rotation and scooping in of air, the axially inner portions of the vanes tend to create a vacuum on the axially outer or mouth sides thereof which causes air to be sucked toward and into the adjacent mouth openings 30, supplementary to air that is scooped in by the axially outer portions of the vanes. On the other hand, if the cover is mounted on the wheel in such manner that the axially inner portions of the vanes 27 move forwardly in the rotation of the cover with the wheel, generally axially outward circulation of air is effected from and through the wheel openings 15 and then out through the air circulation mouth openings 30 of the cover between the vanes. In other words, as the axially inner portions of the vanes 27 move forwardly during such rotation the axially inner portions scoop air from inside the cover to move such air outwardly, and the axially outer portions of the vanes by tending to create a vacuum on the axially outer sides thereof suck air from the axially inner side of the cover outwardly through the mouth openings 30 in supplement to the air scooped by the axially inwardly extending portions of the vanes.

In applying the cover 10 to the outer side of the wheel, a valve stem aperture 31 is registered with a valve stem 32 and the cover is pressed axially inwardly into retained position on the wheel wherein the retaining fingers 24 through the terminal flanges 25 thereof effect tensioned retaining gripping engagement with the intermediate flange 17, and the underturned flange 23 engages against the adjacent portion of the terminal flange 18. Removal of the cover can readily be effected by inserting a pry-off tool behind the underturned margin 23 and exerting pry-off leverage.

In making the cover 10, it may be drawn and shaped throughout its contour and the marginal retaining finger structure completed according to the method covered in my Patent 2,707,449 dated May 3, 1955, with the intermediate cover portion 21 in a solid annular, imperforate condition, in this instance flat, as indicated in dash outline in FIGURES 4 and 5 and shown in full outline in FIGURE 6. Then, the intermediate cover portion 21 is severed along radial lines into vane sections and the vane sections are tilted relative to the original plane of the intermediate cover portion 21, with part of each of the vane sections tilted toward one side of the plane and the remainder toward the opposite side of the plane, in the present instance substantially equal portions of each of the vanes 27 being tilted toward each side of the plane. This is highly advantageous in that by displacing the mouth edge of each of the vanes only a limited distance in each instance, a gap of twice that distance is afforded for each of the air passage mouth openings 30. Moreover, by the limited distance of metal displacement in tilting of the vanes according to this method a quite moderate working of the displaced material within an easy working range is accomplished so that liability of rupture of material formed up in the side wall flanges 28 and 29 of the louver-like vane structures is greatly minimized for high speed production.

In a desirable forming die apparatus as depicted in FIGURES 4, 5 and 6, formation of the vanes 27 is effected between opposed mating complementary forming die members 33 and 34 which conveniently may be of ring shape. These die members are constructed and arranged for not only shearingly slitting the intermediate cover portion 21 but also tilting the vane sections into the tilted vanes 27 and forming the side wall panels or flanges 28 and 29. For this purpose, the lower die member 33 is provided with a series of uniform generally saw-tooth shaping projections 35 having respective shearing edges 37 and slanted vane forming surfaces 38. At each side each of the forming projections 35 has a louver side wall flange sizing surface 39 which is inset from the adjacent side surface of the die member 33 sufficiently to accommodate the thickness of the side wall flange accommodated thereby.

Complementary to the shaping projections 35 of the die member 33, the die member 34 has substantially identical shaping projections 40 each having a shearing edge 41 and a slanted vane shaping oblique surface 42. At their sides the projections 40 are provided with inset sizing surfaces 43 as indicated in FIG. 6, similar to the sizing surfaces 39 of the forming projections 35.

Initially, the vane-forming punch projections 35 and 40 contact the respective opposite sides of the cover portion 21 as shown in FIG. 6, with the shearing edges 37 and 41 complementally opposing one another in shearing relation. Then, by simultaneous movement of the die members 33 and 34 toward one another as indicated by the directional arrows in FIGURES 4 and 6, the cover portion 21 is slit along the radial lines which separate the same into the vane sections. As the die members 33 and 34 continue as nearly as practicable an equal rate of travel toward one another, the respective opposed oblique complementary forming surfaces 38 and 42 of the punch projections progressively tilt the vane sections 27 and draw the louver side wall flanges 28 and 29 until the die members 33 and 34 come to a mutual stop with the vane sections 27 fully formed and sizingly clamped between the forming surfaces 38 and 42.

Cooperatively related to the die members 33 and 34 are other die members related in a convenient association for die press operation. For this purpose, the arrangement generally depicted in FIGURE 4 is desirably employed, comprising a lower die assembly which may be supported upon the anvil or bed of a power operated press and includes a radially inner cover supporting ring member 44 and a radially outer cover supporting ring member 45 between which the forming ring member 33 is mounted. Complementary thereto is an upper die assembly adapted to be carried by the ram of the press for reciprocable movement into die closing and die opening relation to the lower die assembly and including a radially inner die ring member 47 and a radially outer die ring member 48 spaced therefrom and between which the forming die ring 34 is mounted. The function of the inner opposed lower and upper die ring members 44 and 47 is to clamp the outer side of the cover crown portion 20 and the intermediate cover portion 21a firmly therebetween to retain the same against distortions during vane-forming operation of the punch projections 35 and 40. Coactively, the function of the opposed lower and upper die members 45 and 48 is to clamp therebetween the radially outer part 21b of the intermediate cover portion and the adjacent marginal portion of the cover member and hold the same firmly against distortion during the vane-forming operation.

In operation, the important consideration is to effect such a sequence of functioning of the die parts as to effect simultaneous shearing of the slits across the cover portion 21 and then uniform displacement of the vane sections 27 tiltably toward the opposite sides of the original circumferential plane of the cover portion 21. At the same time, of course, convenient loading of the cover blanks into the die assembly and unloading thereof in mass production must be attended to. To this end, the cover supporting lower die members 44 and 45 may be mounted stationarily and the forming die member 33 reciprocably related thereto for movement from a retracted position of the forming punch projections 35 below the intermediate cover portion supporting surfaces of the die members 44 and 45. Similarly, the upper cover clamping die members 47 and 48 may be mounted for joint movement into and out of clamping engagement with the lower die members 44 and 45, respectively, while the forming die member 34 may be reciprocably disposed between the die members 47 and 48 for retraction to an inactive position therebetween and protraction into forming relation wherein the forming projections 40 thereof pass into and through the plane of the fixedly supported intermediate cover portion while the die member 33 in complementary relation is simultaneously moved toward the forming die member 34 upwardly into and through the plane of the fixedly supported intermediate cover portion 21. On the other hand, if preferred, the lower forming die member 33 may be stationarily supported and the lower die members 44 and 45 reciprocably mounted normally to project in the intermediate cover portion supporting surface areas thereof above the shearing edges 37 of the forming projections 35 and movable into a lower median position of the intermediate cover portion 21 relative to the forming projections 35 and 40 as thrust by the upper die members 47 and 48 and in proper timed sequence with vane forming operation of the upper die ring member 34. An advantage of the latter mode of operation of the die assembly resides in positive separation and ejection of the completed cover from the forming projections 35 and 40 should there be any tendency toward sticking or seizing of the side wall portions 28 and 29 of the completed, sized vane-louver formations with respect to the side sizing surfaces 39 and 43 of the forming projections and the coactive opposing sizing surfaces provided by the lower die members 44 and 45 with respect to the punch projection side sizing surfaces 43 and the corresponding sizing surfaces provided by the die members 47 and 48 with respect to the sizing surfaces 39 of the forming projections 35.

It will be understood that modifications and variations may be effected without departing from the scope of the novel concepts of the present invention.

I claim as my invention:

1. In an air circulation wheel structure including a wheel body and a tire rim with openings through the wheel adjacent to juncture of the wheel body and tire rim, a wheel cover member for disposition over the outer side of the wheel having an annular portion for disposition opposite the wheel openings, said annular portion having a circumferential series of air circulation openings and circumferentially tilted air circulation promoting vanes at said openings with portions of the vanes disposed axially outwardly from the original circumferential plane of said annular cover portion and portions of the vanes disposed axially inwardly from said original circumferential plane, said vanes having louver side flanges integrally connecting the outwardly projecting portions of the vanes to the cover member and side flanges integrally connecting the inwardly projecting vane portions to the cover member.

2. In a cover member for disposition over the outer side of a vehicle wheel, circular radially inner and radially outer cover portions with an intermediate portion therebetween, said intermediate portion being uniformly subdivided into a circumferential series of air circulation promoting vanes and openings through the cover member, with substantial portions of the vanes projecting axially outwardly beyond an original circumferential plane of the intermediate cover portion and substantial portions of the vanes projecting axially inwardly beyond such plane and thereby affording air circulation promoting vane surfaces with are the sum of the axially inwardly and axially outwardly projecting portions of the vanes, said vanes being tilted circumferentially and having the adjacent axially outer and axially inner ends offset to afford substantial generally circumferentially opening air circulation mouth apertures, said vanes having at the radially inner and outer sides thereof angularly related integral side flanges connecting the same with respectively said radially inner and radially outer cover portions.

3. In a cover member for disposition over the outer side of a vehicle wheel, circular radially inner and radially outer cover portions with an intermediate portion therebetween, said intermediate portion being uniformly subdivided into a circumferential series of air circulation promoting vanes and openings through the cover member, with substantial portions of the vanes projecting axially outwardly beyond an original circumferential plane of the intermediate cover portion and substantial portions of the vanes projecting axially inwardly beyond such plane and thereby affording air circulation promoting vane surfaces which are the sum of the axially inwardly and axially outwardly projecting portions of the vanes, said vanes being tilted circumferentially and having the adjacent axially outer and axially inner ends offset to afford substantial generally circumferentially opening air circulation mouth apertures, narrow parts of the intermediate cover portion intervening between said vanes and said radially inner and radially outer cover portions and the vanes having angular reinforcing side flanges connecting the sides of the vanes with said narrow intermediate cover parts.

4. In a cover for disposition over the outer side of a vehicle wheel having openings therein for air circulation therethrough, a circular cover member having radially inner and radially outer portions with an intermediate annular portion of substantial width therebetween, said intermediate annular portion being slit radially and subdivided at uniform circumferentially spaced intervals into a plurality of vane sections, said vane sections being tilted equally toward opposite sides of the original circumferential plane of the intermediate cover portion and with portions of said intermediate cover portion bent into angular substantially axially extending and susbtantially triangular side reinforcing flanges connecting the respective axially outer and axially inner portions of the vanes to said radially inner and radially outer cover portions.

5. In a cover member for disposition over the outer side of a vehicle wheel, circular radially inner and radially outer cover portions with an intermediate portion therebetween, said intermediate portion being uniformly subdivided into a circumferential series of air circulation promoting vanes and openings through the cover member, with substantial portions of the vanes projecting axially outwardly beyond an original circumferential plane of the intermediate cover portion and substantial portions of the vanes projecting axially inwardly beyond such plane and thereby affording air circulation promoting vane surfaces which are the sum of the axially inwardly and axially outwardly projecting portions of the vanes, said vanes being tilted circumferentially and having the adjacent axially outer and axially inner ends offset to afford substantial generally circumferentially opening air circulation mouth apertures, a leading axially outer edge of each vane formerly having been joined with a trailing axially inner edge of the vane immediately circumferentially adjacent thereto and with the associated leading and trailing edges being slightly circumferentially spaced with respect to one another and substantially axially spaced with respect to one another.

6. In a cover member for disposition over the outer side of a vehicle wheel, circular radially inner and radially outer cover portions with an intermediate portion therebetween, said intermediate portion being uniformly subdivided into a circumferential series of air circulation promoting vanes and openings through the cover member, with substantial portions of the vanes projecting axially outwardly beyond an original circumferential plane of the intermediate cover portion and substantial portions of the vanes projecting axially inwardly beyond such plane and thereby affording air circulation promoting vane surfaces which are the sum of the axially inwardly and axially outwardly projecting portions of the vanes, said vanes being tilted circumferentially and having the adjacent axially outer and axially inner ends offset to afford substantial generally circumferentially opening air circulation mouth apertures, a leading axially outer edge of each vane formerly having been joined with a trailing axially inner edge of the vane immediately circumferentially adjacent thereto and with the associated leading and trailing edges being slightly circumferentially spaced with respect to one another and substantially axially spaced with respect to one another, each of said vanes being linked at its radially opposite sides with said radially inner and radially outer cover portions by means of axially extending louver side flanges.

7. In a cover member for disposition over the outer side of a vehicle wheel, circular radially inner and radially outer cover portions with an intermediate portion therebetween, said intermediate portion being uniformly subdivided into a circumferential series of air circulation promoting vanes and openings through the cover member, with substantial portions of the vanes projecting axially outwardly beyond an original circumferential plane of the intermediate cover portion and substantial portions of the vanes projecting axially inwardly beyond such plane and thereby affording air circulation promoting vane surfaces which are the sum of the axially inwardly and axially outwardly projecting portions of the vanes, said vanes being tilted circumferentially and having the adjacent axially outer and axially inner ends offset to afford substantial generally circumferentially opening air circulation mouth apertures, a leading axially outer edge of each vane formerly having been joined with a trailing axially inner edge of the vane immediately circumferentially adjacent thereto and with the associated leading and trailing edges being slightly circumferentially spaced with respect to one another and substantially axially spaced with respect to one another, each of said substantial portions of each vane having radially inner and outer louver side flanges with the radially inner of the louver side flanges joining the vane with the radially inner cover portion and with the radially outer of the side flanges joining the vane with the radially outer cover portion.

8. In an air circulation wheel structure including a wheel body and a tire rim with openings through the wheel adjacent to juncture of the wheel body and tire rim, a wheel cover member for disposition over the outer side of the wheel having an annular portion for disposition opposite the wheel openings, said annular portion having a circumferential series of air circulation openings and circumferentially tilted air circulation promoting vanes at said openings with portions of the vanes disposed axially outwardly from the original circumferential plane of said annular cover portion and portions of the vanes disposed axially inwardly from said original circumferential plane, said vanes having the opposite ends thereof so related to said openings that one of the ends has a scooping effect for moving air through the openings in the rotation of the cover on the wheel to carry such ends forwardly while the opposite ends have an aspirating effect with respect to the openings by tendency to cause a vacuum during such rotation of the cover with the wheel, a leading axially outer edge of each vane formerly having been circumferentially contiguous with a trailing axially inner edge of the vane immediately circumferentially adjacent thereto and with the associated leading and trailing edges being slightly circumferentially spaced with respect to one another and substantially axially spaced with respect to one another, said annular portion formerly comprising a continuous annular piece of cover material and with all of this material comprising said circumferentially spaced vanes.

References Cited in the file of this patent
UNITED STATES PATENTS

| | | |
|---|---|---|
| 1,669,951 | Stitt | May 15, 1928 |
| 1,672,835 | Wasserfallen | June 5, 1928 |
| 1,684,601 | Shpater | Sept. 18, 1928 |
| 1,724,604 | Lambert | Aug. 13, 1929 |
| 2,599,707 | Gandelot | June 10, 1952 |
| 2,674,787 | Lyon | Apr. 13, 1954 |
| 2,844,115 | Lyon | July 22, 1958 |
| 2,857,024 | Lyon | Oct. 21, 1958 |
| 2,857,025 | Lyon | Oct. 21, 1958 |
| 2,861,325 | Lyon | Nov. 25, 1958 |
| 2,921,548 | Lyon | Jan. 19, 1960 |

FOREIGN PATENTS

| | | |
|---|---|---|
| 787,597 | France | July 8, 1935 |